May 15, 1962 F. HINRICHS ET AL 3,034,443
ELECTRIC MOTOR DRIVEN PUMPS
Filed Aug. 8, 1960
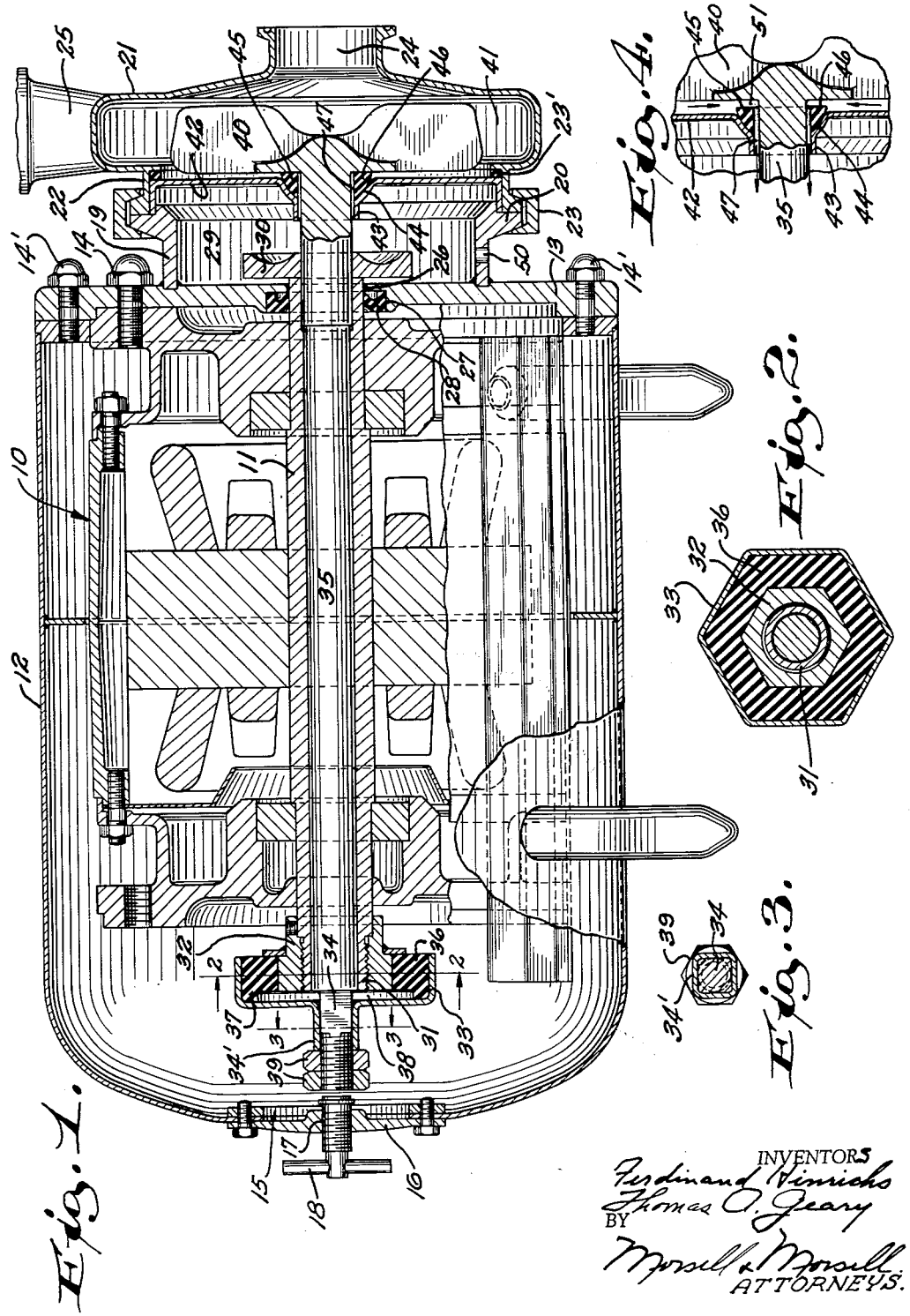
INVENTORS
Ferdinand Hinrichs
Thomas O. Geary
BY
Morsell & Morsell
ATTORNEYS.

United States Patent Office 3,034,443
Patented May 15, 1962

3,034,443
ELECTRIC MOTOR DRIVEN PUMPS
Ferdinand Hinrichs, Milwaukee, and Thomas A. Geary, Kenosha, Wis., assignors to Ladish Co., Cudahy, Wis., a corporation of Wisconsin
Filed Aug. 8, 1960, Ser. No. 48,204
9 Claims. (Cl. 103—87)

This invention relates to improvements in electric motor driven pumps.

It is a general object of the present invention to provide as a unitary device an electric motor driven pump, the pump being positioned at one end of the motor and there being novel means for cleaning the seal around the pump shaft without disassembling the pump or motor, this arrangement permitting the flushing of the pump and main seal while these parts are in place.

A further object of the invention is to provide a compact motor and pump unit having novel means including a flexible drive for transmitting motion from the motor to the pump.

A more specific object of the invention is to provide a device as above described wherein the motor drives a tubular shaft and wherein the pump shaft extends through the tubular shaft, there being a novel coupling arrangement between the pump shaft and motor shaft which permits axial movement of the pump shaft with respect to the motor shaft to provide a temporary separation of parts at the seal when it is desired to flush in place.

With the above and other objects in view, the invention consists of the improved motor driven pump and all of its parts and combinations, as set forth in the claims, and all equivalents thereof. In the accompanying drawing illustrating one complete embodiment of the preferred form of the invention in which the same reference numerals designate the same parts in all of the views:

FIG. 1 is a view, principally in longitudinal vertical section, through the electric motor driven pump;

FIG. 2 is a sectional view through the elastic coupling taken on the line 2—2 of FIG. 1;

FIG. 3 is a sectional view taken on the line 3—3 of FIG. 1; and

FIG. 4 is a fragmentary vertical sectional view showing the position of the parts adjacent the main seal of the pump when the pump shaft has ben moved axially to permit cleaning in place.

Referring now more particularly to the drawing, the numeral 10 designates an electric motor having a central tubular driven shaft 11. The motor is mounted in an outer casing 12 having an end plate 13, the motor being bolted to the end plate by means of bolts 14 and the end plate being detachably bolted to the end of the casing 12 as by bolts 14'. The other end of the outer casing 12 is rounded and has an end opening 15 normally closed by a plate 16 having a threaded central opening 17 and receiving a pressure exerting device such as a screw 18.

Projecting concentrically from the end plate 13 of the casing 12 is a tubular coupling extension 19 having a coupling flange 20 with a tapered inner annual face. A pump having a casing 21 with a cooperating coupling extension 22 is adapted to be detachably connected to the coupling extension 19 by means of a clamping band 23. The pump casing has an axial inlet 24 and a peripheral outlet portion 25.

One end of the tubular motor shaft 11 projects through a central hole 26 in the end wall 13, the inner side of the wall having a seal recess 27 for receiving a seal 28 which surrounds the pump shaft. Connected to the outer end of the motor shaft 11 and located within the chamber 29 of the coupling extension 19 is a suitable sealing unit 30 adapted to seal around a pump shaft 35.

The opposite end of the motor shaft 11 projects beyond the motor casing proper where there is a threaded portion 31 of reduced diameter receiving a hexagonal fitting 32 as shown in FIG. 2, the latter being within a hexagonal cup-shaped portion of another fitting member 33. The latter has a squared tubular extension 34' mounted on a squared portion 34 of the pump shaft 35. Between these hexagonal fitting portions 32 and 33, preferably bonded thereto, is an elastic coupling member 36 formed of any suitable material such as neoprene, buna-N, or silicone material. The rear face of the elastic coupling 36 has a rearwardly projecting circumferential rim 37 abutting the back wall of the cup-shaped fitting 33 to leave a space 38. The fitting 33 is held in proper longitudinal position by nuts 39 threaded on the extreme outer end of the pump shaft 35, said end being in alinement with the stem of the hand screw 18.

The coupling just described provides for transmission of power from the tubular shaft 11 of the electric motor to the hexagonal fitting 32 and through the elastic material 36 to the hexagonal fitting 33 on the coaxial pump shaft 35.

The opposite end of the pump shaft extends into the pump chamber and is equipped with an impeller 40. The inner wall of the pump chamber 41 is formed by a separable flanged plate 42 which is held in place by the coupling ring 23 against a seal 23'. The plate 42 has a central inwardly projecting boss 43 having an enlarged inner portion which forms a spherical seat 44 for a seal 45, the latter having a spherical portion coacting with the seal. There is an annular clearance space 47 between the seal 45 and the shaft 35 and a communicating space between the end of the bushing 43 and the shaft 35. The spherical seal 45 can oscillate on its seat with slippage at 46.

In use of the pump, during normal operation the electric motor will drive the impeller 40 to pull liquid into the inlet 24 and expel it from the peripheral outlet 25. The flexible coupling at 36 in addition to other uses to be hereinafter described provides a safety factor in case of clogging of the pump and serves to prevent damage to the parts when such abnormal condition occurs.

In view of the fact that this type of pump is designed particularly for use in dairy, food or pharmaceutical lines, it is necessary to frequently clean the pump and the main seal 45 around the pump impeller. Heretofore it has been necessary to disassemble the pump from the motor in order to accomplish such cleaning. With the present invention such cleaning may be easily performed in place. By turning the hand screw 18 inwardly to push against the end of the shaft 35, the latter may be moved a limited distance axially toward the right (referring to FIG. 1) to the position shown in FIG. 4. This movement is permitted by the space 38 at the back of the flexible member 33 in the flexible coupling, the periphery of the coupling yielding to permit such axial movement. When such movement occurs the inner end of the impeller is pushed away from the end face 46 of the seal 45 to leave a space 51 between the impeller and seal. The bore of the seal provides clearance at 47 between it and the pump shaft. Thus, when the pump shaft is moved axially, communication is opened up to the chamber 29 as shown in FIG. 4 so that flushing liquid can pass between the inner end of the impeller and the end of the seal 45 and between the seal 45 and pump shaft out of the end of the bushing 43 into the chamber 29. This flushing liquid will then be discharged from the drain openings 50. During such flushing the sealing members 30 and 28 effectively prevent entrance of the flushing liquid into the motor housing or between the pump shaft 35 and motor shaft 11.

In lieu of the screw 18, other devices may be employed for moving the pump shaft axially to flushing position. Such mechanisms may be power actuated remote control devices or any other convenient means for imposing of force from the exterior on the inner end of the pump shaft 35.

It is obvious that certain phases of the present invention have utility when the drive sleeve 11 is driven by means other than an electric motor and it is to be understood that the present invention is not to be limited to the exact details of construction shown and described for obvious modifications will occur to persons skilled in the art.

What we claim is:

1. A pumping unit comprising an electric motor having a tubular driven shaft extending therethrough, a pump supported coaxially of said motor at one end thereof, said pump having an impeller with a shaft which projects slidably through said tubular driven shaft and which has an end remote from said pump projecting from the end of the motor which is remote from the pump, a flexible coupling comprising a body of flexible material connecting said remote end and tubular driven shaft providing a driving connection between said motor shaft and pump shaft, said coupling also being constructed to permit axial flexing of said flexible material to provide for axial movement of the pump shaft with respect to the tubular shaft whereby the impeller may be moved axially in its casing to facilitate cleaning.

2. A pumping unit comprising an electric motor having a tubular driven shaft, a pump supported coaxially of said motor at one end thereof, said pump having an impeller with a shaft which projects slidably through said tubular driven shaft and which has an end remote from said pump projecting from the end of the motor which is remote from the pump, a flexible coupling comprising a body of flexible material connecting said remote end and tubular shaft providing a driving connection between said motor shaft and pump shaft, said coupling also being constructed to permit axial flexing of said flexible material to provide for axial movement of the pump shaft with respect to the tubular shaft whereby the impeller may be moved axially in its casing to facilitate cleaning, and normally externally accessible means engageable with said remote end of the pump shaft for causing said axial movement.

3. A pumping unit comprising an electric motor having a tubular driven shaft, a pump supported coaxially of said motor at one end thereof, said pump having an end wall with an impeller shaft hole, an impeller with a shaft which projects slidably through said end wall hole and through said tubular driven shaft and which has an end remote from said pump projecting from the end of the motor which is remote from the pump, seal supporting means in said end wall around said pump shaft hole, a seal in said supporting means having a hole through which the shaft extends loosely to provide an annular clearance space, said seal being normally in engagement with the adjacent end of said impeller to normally prevent flow of liquid through said clearance space, a flexible coupling comprising a body of flexible material connecting said remote end and tubular shaft providing a driving connection between said motor shaft and pump shaft, said coupling also being constructed to permit axial flexing of said flexible material to provide for axial movement of the pump shaft with respect to the tubular shaft whereby the impeller may be moved axially in its casing away from said seal to open up communication with said annular clearance space, and means engageable with said remote end of the pump shaft for causing said axial movement.

4. A pumping unit comprising an electric motor having a tubular driven shaft, a pump supported coaxially of said motor at one end thereof, said pump having an end wall with an impeller shaft hole, an impeller with a shaft which projects slidably through said end wall hole and through said tubular driven shaft and which has an end remote from said pump projecting from the end of the motor which is remote from the pump, seal supporting means in said end wall around said pump shaft hole, a seal in said supporting means having a hole through which the shaft extends loosely to provide an annular clearance space, said seal being normally in engagement with the adjacent end of said impeller to normally prevent flow of liquid through said clearance space, a flexible coupling comprising a body of flexible material connecting said remote end and tubular shaft providing a driving connection between said motor shaft and pump shaft, said coupling also being constructed to permit axial flexing of said flexible material to provide for axial movement of the pump shaft with respect to the tubular shaft whereby the impeller may be moved axially in its casing away from said seal to open up communication with said annular clearance space, a drain chamber between said end wall of the pump casing and the electric motor into which flushing liquid may flow when the impeller has been thus moved axially, said drain chamber having outlet holes and normally externally accessible manually operable means engageable with said remote end of the pump shaft for causing said axial movement.

5. A pumping unit comprising an outer casing, an electric motor supported within said outer casing and having a tubular driven shaft, a pump supported on one end of said casing coaxially of said motor, said casing having an opposite end, said pump having an impeller with a shaft which projects slidably through said tubular driven shaft and which has an end remote from said pump projecting from the end of the motor remote from the pump and located within the outer casing near the end thereof which is remote from the pump, a flexible coupling comprising a body of flexible material connecting said remote end of the pump shaft and tubular shaft providing a driving connection between said motor shaft and pump shaft, said coupling also being constructed to permit axial flexing of said flexible material to provide for axial movement of the pump shaft with respect to said tubular shaft whereby the impeller may be moved axially in its casing to facilitate cleaning, and means accessible externally of the outer casing carried by said end thereof which is remote from the pump for causing said axial movement.

6. A pumping unit comprising an outer casing having a closed end and having an opposite end, an end plate removably closing said opposite end, an electric motor within said outer casing detachably connected to said end plate and supported thereby for withdrawal therewith, said motor having a tubular driven shaft with one end journaled through said end plate, a pump detachably supported on the outer side of said end plate of said casing coaxially of said motor, said pump having an impeller with a shaft which projects slidably through said tubular driven shaft and which has an end remote from said pump projecting from the end of the motor remote from the pump and located within the outer casing near the end thereof which is remote from the pump, and a flexible coupling between said remote end and tubular driven shaft providing a driving connection between said motor shaft and pump shaft.

7. In a pump having a pump casing with a centrally apertured end wall, there being an impeller in said casing, a pump shaft connected to said impeller and having a portion projecting rotatably through said end wall aperture of said pump casing with an end remote from said pump casing, a tubular driven shaft supported axially and externally of said pump casing for rotation, said projecting portion of the pump shaft extending through said tubular driven shaft and having an end projecting therebeyond, a fitting rigidly secured to said projecting end and having a cup-shaped portion surrounding the adjacent end of the tubular driven shaft, a fitting secured on said end of the tubular driven shaft within said cup-shaped portion, a flexible coupling member comprising a body of flexible material connecting said last mentioned fitting and the inside of the rim of the cup-shaped portion, there being space between the bottom of said cup-shaped portion and said driven shaft fitting to provide for axial movement with respect to said tubular driven shaft, and means supported for engagement with said remote end of said pump shaft for causing said axial movement whereby said impeller may be moved axially in said pump casing to facilitate cleaning.

8. In a pump having a pump casing with a centrally apertured end wall, there being an impeller in said casing, a pump shaft connected to said impeller and having a portion projecting rotatably through said end wall aperture of said pump casing with an end remote from said pump casing, seal supporting means in said end wall surrounding said pump shaft aperture, a seal supported therein around the pump shaft to be normally in engagement with the adjacent end of said impeller, there being an annular clearance space between said seal and pump shaft which is normally out of communication with the interior of the pump casing, a tubular driven shaft supported axially and externally of said pump casing for rotation, said projecting portion of the pump shaft extending through said tubular driven shaft and having an end projecting therebeyond, a fitting rigidly secured to said projecting end and having a cup-shaped portion surrounding the adjacent end of the tubular driven shaft, a fitting secured on said end of the tubular driven shaft within said cup-shaped portion, a flexible coupling member comprising a body of flexible material connecting said last mentioned fitting and the inside of the rim of the cup-shaped portion, there being space between the bottom of said cup-shaped portion and said driven shaft fitting to provide for axial movement with respect to said tubular driven shaft, and means supported for engagement with said remote end of said pump shaft for causing said axial movement whereby said impeller may be moved axially in said pump casing away from said pump shaft seal to facilitate cleaning and permit flushing liquid to pass through said clearance space between said seal and pump shaft.

9. A pumping unit comprising an outer casing having a closed end and having an opposite end, an end plate removably closing said opposite end, an electric motor within said outer casing supported entirely by said end plate for withdrawal therewith, said motor having a tubular driven shaft with one end journaled through said end plate, a pump detachably supported on the outer side of said end plate of said casing coaxially of said motor, said pump having an impeller with a shaft which projects slidably through said tubular driven shaft and which has an end remote from said pump projecting from the end of the motor remote from the pump and located within the outer casing near the end thereof which is remote from the pump, and a coupling between said remote end and tubular driven shaft providing a driving connection between said motor shaft and pump shaft.

References Cited in the file of this patent

UNITED STATES PATENTS

| | | |
|---|---|---|
| 1,687,658 | Conant | Oct. 16, 1928 |
| 1,716,284 | Risley | June 4, 1929 |
| 2,092,351 | Huntzicker | Sept. 7, 1937 |
| 2,327,389 | Bagnall | Aug. 24, 1943 |
| 2,434,979 | Bergh | Jan. 27, 1948 |
| 2,437,954 | Havill | Mar. 16, 1948 |
| 2,868,438 | Gammon et al. | Jan. 13, 1959 |

FOREIGN PATENTS

| | | |
|---|---|---|
| 622,266 | Germany | Nov. 7, 1935 |